US012673284B2

(12) United States Patent
Rutledge

(10) Patent No.: US 12,673,284 B2
(45) Date of Patent: Jul. 7, 2026

(54) FILTER LIFT APPARATUS AND METHOD

(71) Applicant: David Thomas Rutledge, Scottsdale, AZ (US)

(72) Inventor: David Thomas Rutledge, Scottsdale, AZ (US)

( * ) Notice: Subject to any disclaimer, the term of this patent is extended or adjusted under 35 U.S.C. 154(b) by 235 days.

(21) Appl. No.: 18/349,396

(22) Filed: Jul. 10, 2023

(65) Prior Publication Data

US 2025/0018322 A1     Jan. 16, 2025

(51) Int. Cl.
| | |
|---|---|
| B01D 46/00 | (2022.01) |
| B01D 46/88 | (2022.01) |
| F24F 7/02 | (2006.01) |
| F24F 8/108 | (2021.01) |

(52) U.S. Cl.
CPC ......... B01D 46/0004 (2013.01); B01D 46/88 (2022.01); F24F 7/02 (2013.01); F24F 8/108 (2021.01)

(58) Field of Classification Search
None
See application file for complete search history.

(56) References Cited

U.S. PATENT DOCUMENTS

| | | | | |
|---|---|---|---|---|
| 5,958,114 | A * | 9/1999 | Sunahara | F24F 1/008 |
| | | | | 96/417 |
| 6,379,412 | B1 * | 4/2002 | Porterfield | B01D 46/88 |
| | | | | 55/DIG. 35 |
| 6,461,235 | B2 * | 10/2002 | Rutler | F24F 13/085 |
| | | | | 55/385.2 |
| 7,993,434 | B2 * | 8/2011 | Oscar | B01D 46/10 |
| | | | | 55/501 |
| 9,127,856 | B2 | 9/2015 | Cole | |
| 9,644,862 | B1 | 5/2017 | Korte | |
| 10,376,827 | B2 | 8/2019 | Cole | |
| 10,520,216 | B2 | 12/2019 | Cole | |
| 10,527,315 | B2 | 1/2020 | Cole | |
| 10,960,339 | B2 | 3/2021 | Cole | |
| 2009/0077987 | A1 | 3/2009 | Egawa et al. | |
| 2009/0078121 | A1 * | 3/2009 | Hepburn | A61L 9/16 |
| | | | | 96/222 |

(Continued)

FOREIGN PATENT DOCUMENTS

| | | |
|---|---|---|
| JP | 2005156084 A | 6/2005 |

OTHER PUBLICATIONS

Mitsubishi Electric Automatic Elevation Grille; Mitsubishi Electric—Living Environmental Systems (UK); Oct. 2, 2015 https://youtu.be/DicBw4cWL-o?si=iOtpkgFGHnneUJEN Access Date: May 19, 2026.

*Primary Examiner* — Brit E. Anbacht
(74) *Attorney, Agent, or Firm* — Reinhart Boerner Van Deuren P.C.

(57)     ABSTRACT

A filtered vent system for a return air duct in a ceiling, the vent system includes a bracket configured to mount to the ceiling. A vent frame mounts to the bracket to fix the frame to the ceiling. A vent plate carries an air filter. A hoist arrangement is mounted to the vent frame and is connected to the vent plate. A hoist arrangement is actuable through an aperture in the vent frame to move the vent plate from a first state in contact with the vent frame to a second state free from contact with the vent frame and spaced apart from the vent frame a distance permitting removal of the air filter.

17 Claims, 12 Drawing Sheets

(56)          References Cited

U.S. PATENT DOCUMENTS

| | | | |
|---|---|---|---|
| 2009/0165432 A1* | 7/2009 | Yabu | F24F 13/20 |
| | | | 55/480 |
| 2009/0199526 A1 | 8/2009 | Wallace | |
| 2013/0199142 A1 | 8/2013 | Kerr, Jr. | |
| 2016/0039058 A1* | 2/2016 | Cole | F24F 13/28 |
| | | | 29/428 |
| 2017/0151526 A1* | 6/2017 | Cole | F24F 13/28 |
| 2020/0316513 A1* | 10/2020 | Zhao | B01D 46/88 |
| 2021/0213382 A1* | 7/2021 | Cole | F24F 11/56 |
| 2022/0082277 A1 | 3/2022 | Lowe | |
| 2022/0362705 A1* | 11/2022 | Stabile | B01D 46/88 |

* cited by examiner 196          224          198

FILTER LIFT APPARATUS AND METHOD

FIELD OF THE INVENTION

This invention generally relates to air return vents and more particularly to filtered vent systems for the return air in commercial buildings and residential homes with heating, ventilation, and air conditioning systems.

BACKGROUND OF THE INVENTION

Residential homes and commercial buildings typically have HVAC (heating, ventilation, and air conditioning) systems to regulate the home or building's internal air temperature as well as to improve indoor air quality. HVAC systems draw in air, referred to as return air, from the home or building through filtered air return vents. The filtered air return vents are typically located in the ceilings of the homes or buildings.

Depending on the size of the filtered air return vent, typically, it is recommended that the air filters in the return vents be checked monthly to see if they have accumulated an amount of particulate that prevents them from permitting sufficient air flow therethrough (a dirty filter). When too much particulate accumulates in the air filter, air flow slows or stops and thereby prevents the HVAC system from operating efficiently or at all.

When the HVAC system is operating with a dirty filter in the air return vent, air within the home or building may not be sufficiently filtered to provide for the desired healthy, "quality" clean air in the home or building. Because of this, manufacturers of the HVAC systems may recommend that the air filters be checked at least monthly and/or changed out monthly to ensure the HVAC system operates efficiently with proper filtered air flow to sufficiently filter the air and to properly cool, ventilate, and heat the home or building while maintaining healthy air within the home or building.

Far too often, the air filters in the air return vents are not checked nor changed out regularly because of the imposition it requires, namely having to access the ceiling of a home or building where the filtered air vent is located. Indeed, to change the air filter in the air return vent, a ladder is required to reach the return vent located in the ceiling. However, dragging a ladder, reaching above one's head to open a cover of the filter housing while also holding the replacement air filter, swapping out the dirty air filter with a new air filter, and then carefully descending a ladder while holding a dirty air filter is simply cumbersome and fraught with issues of safety and cleanliness.

FIG. 12 illustrates a user 300 on a ladder with his arms over his head attempting to change out an air filter 302 located in a return air duct 304 of a home. The air filter 302 is located in a vent return housing 306 and covered by a grille 308 that is connected via hinges to the vent return housing 306 mounted in the ceiling 310. This is a problem, especially for an aging population relying on clean air but lacking the full physical strength, mobility, and endurance to climb up on a ladder on a regular basis and clean or replace the existing air filter 302 in the vent return housing 306.

To date, prior art efforts to address the problem of changing out air filters in return vents installed in ceilings have not solved the problems discussed above. For example, U.S. Pat. No. 9,127,856 to Joseph W. Cole entitled, "Method and System for Replacing Air Filter" and its family of patents (hereinafter, "the Cole patents), U.S. Pat. Nos. 10,960,339; 10,520,216; 10,520,216; 10,527,315; 10,376, 827; and U.S. Publication No. 2021/0213382 have not overcome the foregoing problems.

While Cole seeks to provide for retrofitting current return vents, the system requires users to completely remove the permanently installed vent return housing and grille intake before installation. Cole's system is installed within the ceiling and retrofitted to current size airduct return. With Cole's system, the user must pull the filter housing down under tension against a biasing force. The filter housing is pulled down with a pole that is rotated in reverse while the housing is pulled back up into place using the pole. Thus, while the user is pulling down the filter housing of Cole, the pole can unexpectedly disconnect resulting in its filter housing retracting into the ceiling and possibly injuring the user.

Cole's system includes a control tool base that is large and includes a dolly, requiring more storage space. Cole's control tool pole is cumbersome and not user friendly because it requires the user to synchronize multiple places on its pole to rotate for length and locking, as well as to raise and lower. Cole's system is unsteady with the control tool attached to the moveable filter housing, as a user could mistakenly kick or knock into the pole which would cause the filter housing to unsafely sway on its cables. Cole's retrofit installation requires complete removal of the old system, with potential for requiring drywall and paint repair for the ceiling. Thus, Cole's design is best understood as a design for new construction and not a retrofit that can be used with existing return vents.

Cole's system does not use the existing frame in its retrofit and has multiple elements, for example its mounts for its cables that must be attached inside the ceiling on the filter housing. This makes for difficult installation as the user must access and find suitable locations if any inside the ceiling. Cole's biased cables, in connection with its pole to raise and lower its filter, are not user friendly and are awkward to use, and therefore discourage the user from making the required filter checks for change out.

BRIEF SUMMARY OF THE INVENTION

Improving air quality can be achieved by changing the air filters that filter a home or building's air more often. Doing so, however, requires a retrofit adjustment to the current return air filtered vent system in a ceiling.

The invention provides such a filtered vent system and method for its installation that allows for the existing frame in the ceiling to remain in place while only the existing vent plate of the existing return air vent system is removed. These and other advantages of the invention, as well as additional inventive features, will be apparent from the description of the invention provided herein.

In one aspect, the invention provides a filtered vent system for a return air duct in a ceiling. The vent system includes a bracket configured to mount to the ceiling. A vent frame is configured to be mounted to the bracket to fix the frame to the ceiling. A vent plate carries an air filter. A hoist arrangement is mounted to the vent frame and connected to the vent plate. The hoist arrangement is actuable through an aperture in the frame to move the vent plate from a first state in contact with the frame to a second state free from contact with the frame and spaced apart from the frame a distance permitting removal of the filter.

In an embodiment, the bracket is a pair of brackets configured to mount on opposite sides of the air duct.

In an embodiment, each one of the pair of brackets includes a bracket body. A plurality of arm members extend away from the bracket body in a direction generally perpendicular to the bracket body and the ceiling. The plurality of arm members are spaced apart from one another in parallel relation. Each one of the plurality of arm members includes a first portion in contact with the bracket body and a mounting portion free from contact with the mounting portion.

In an embodiment, the mounting portion includes a plurality of detent members. The frame includes a plurality of apertures. Each one of the detent members is received into a respective one of the plurality of apertures of the frame so as to mount the frame to the bracket.

In an embodiment, the frame is configured to surround the air duct without any portion thereof extending into the air duct.

In an embodiment, the actuator extends through the aperture to actuate a gear assembly of the hoist arrangement mounted to the frame.

In an embodiment, the actuator rotates in a first actuation direction to actuate the gear assembly to turn in a first direction to rotate a plurality of pulleys in a pulley system of the hoist arrangement to move the vent plate from the first state to the second state.

In an embodiment, the actuator moves in a second actuation direction, opposite the first actuation direction to actuate the gear assembly to turn in a second direction opposite the first direction to rotate the plurality of pulleys in the pulley system to move the vent plate from the second state to the first state. In the first state, the vent plate is in contact with the frame.

In an embodiment, the pulley system includes ropes connected to the vent plate in an unbiased state.

In an embodiment, simultaneously the ropes are unwound or wound about the plurality of pulleys so as to lower or raise, by rotation of the plurality of pulleys, the vent plate from the first position to the second position and from the second position to the first position.

In an embodiment, the actuator is mounted to a crank pole. The crank pole with the actuator defines a first length of the crank pole. Rotation of the crank pole in a first rotational direction to actuate the actuator does not change the first length of the crank pole as the vent plate moves from the first position to the second position.

In an embodiment, the first length does not change with rotation of the crank pole in a second rotational direction, opposite the first rotational direction, to move the vent plate from the second position to the first position.

In an embodiment, the vent plate has a vent body having four side walls surrounding a slotted face of the vent body. The side walls are in contact with the frame in the first state.

In an embodiment, the actuator is located on the end of a crank pole.

In an embodiment, the actuator includes a torque limiter.

In an embodiment, the crank pole is moveable between a first longitudinal length and a second longitudinal length.

In an embodiment, the frame does not move as the vent plate moves from the first state to the second state and from the second state to the first state.

In another aspect, the invention provides a method for replacing an existing vent return plate and existing air filter in an existing frame for a filtered return air vent in a ceiling duct. The method includes the steps of removing the existing vent return plate while the existing frame surrounding the vent return plate remains fixed to the ceiling. The method includes the step of removing the existing air filter from the filtered air return vent. The method includes the step of fastening a bracket on a portion of the ceiling surrounding the existing frame. The method includes the step of mounting a new frame carrying a new vent plate with a new air filter to the bracket and over the existing frame. The new vent plate is moveable relative to the new frame between a closed state in contact with the frame to an open state wherein the vent plate is free from contact with the frame.

In an embodiment, the method includes the step of inserting an actuator through the new frame to actuate a hoist arrangement having a gear assembly mounted to the frame and connected to a pulley system connected to the vent plate to lower the vent plate from the closed state to the open state.

In an embodiment, the method includes the step of attaching the actuator to a crank pole to allow a user to insert the actuator through the frame while standing on a floor below the ceiling without the crank pole changing length as the vent plate moves between the closed and open state and between the open and closed state.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
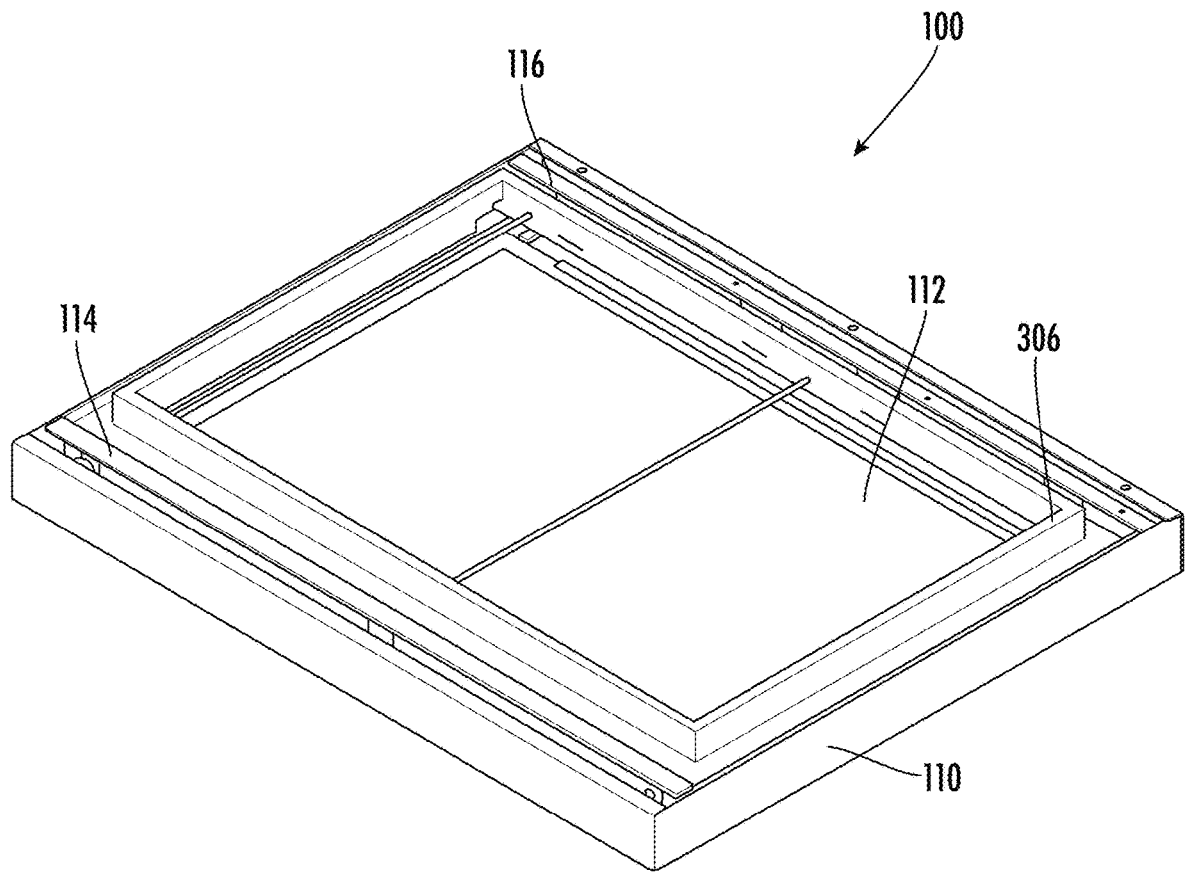
FIG. 1 illustrates a filtered vent system according to the teachings of the instant invention installed around a preexisting frame in a ceiling of a home or commercial building and in a closed state.
Figure 12:
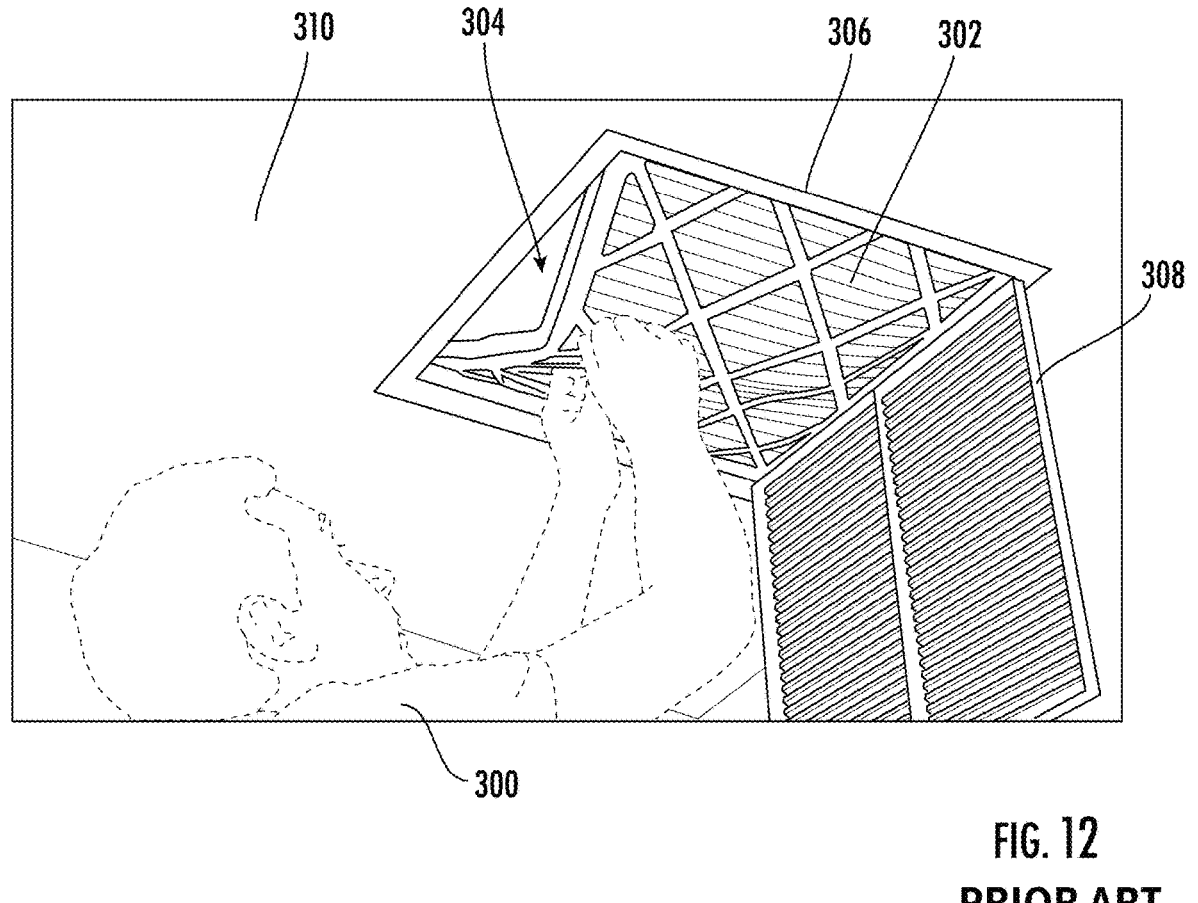
FIG. 12 illustrates a user changing a filter of a prior art filtered vent system.

With respect to FIG. 1, according to the teachings of the instant invention, a top view of a filtered vent system 100 for a return air duct 304 (FIG. 12) in a ceiling 306 (FIG. 12) is illustrated. The filtered vent system 100 is shown surrounding a preexisting frame 306 (FIG. 12) that would be in the ceiling 310 (FIG. 12) that surrounds the return air duct 304 (FIG. 12). The filtered vent system 100 is in a first state, that is a closed state.

Figure 2:
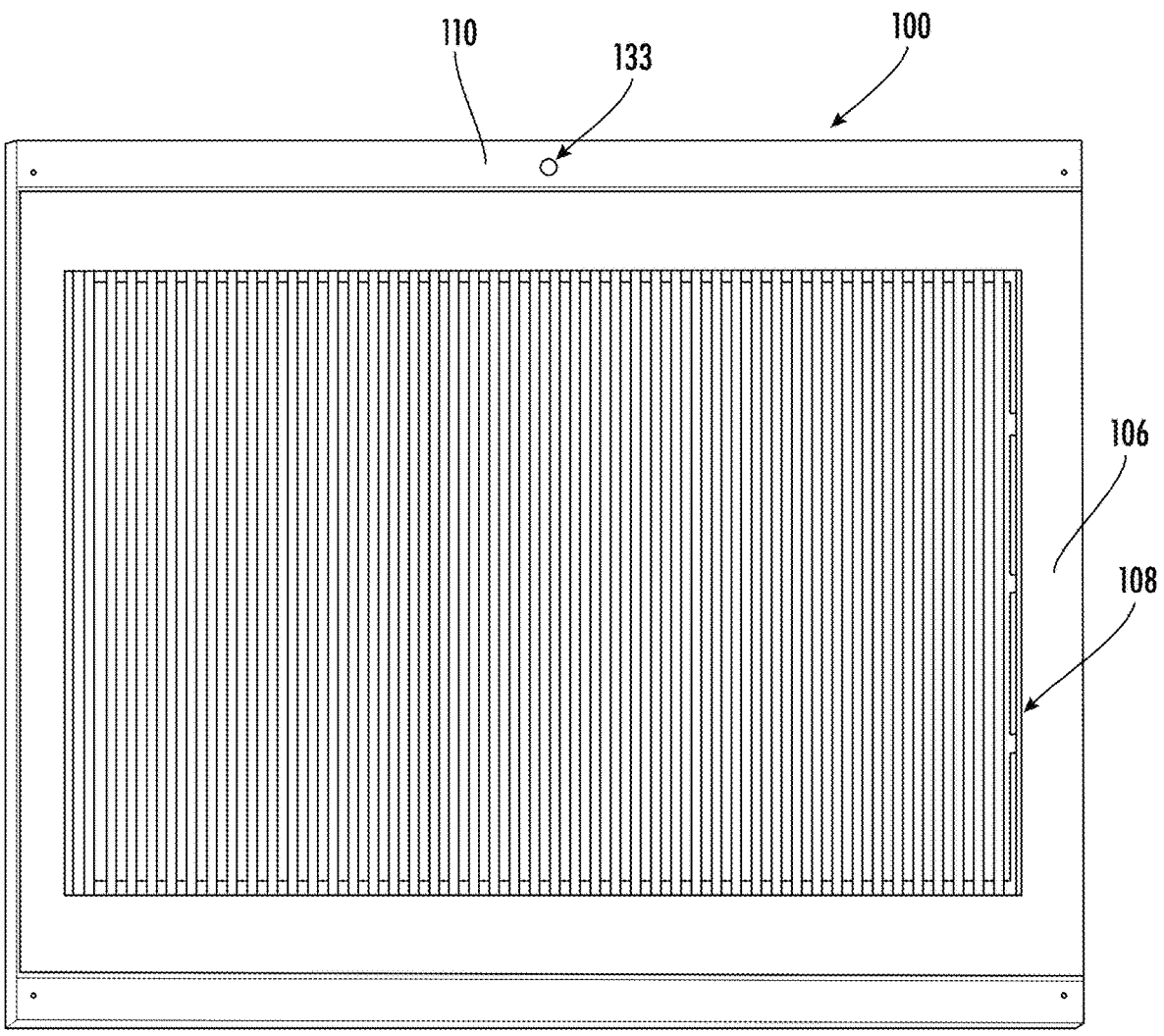
FIG. 2 is a view of the filtered vent system of FIG. 1 as seen by a user standing on the floor and looking up at the ceiling.

FIG. 2 illustrates a bottom view of the filtered vent system 100 in the closed state as typically seen by a user on a floor looking up at the ceiling.

With respect to FIGS. 1 and 2, in the closed state, return air flows from the from the home or building through a vent plate 106 that has a plurality of openings 108, that may be formed by louvres 109 of the vent plate 106. The vent plate 106 is received into a frame 110 of the filtered vent system 100 in the closed state. The frame 110 surrounds the air duct 304 (FIG. 12) without any portion thereof extending into the return air duct 304 (FIG. 12). After passing through the plurality of openings 108, the return air is filtered through an air filter 112 carried by the vent plate 106. The air filter 112 may be of any known filter media for home and business commonly used to filter return air. After passing through the air filter 112, the return air enters the return air duct 304 (FIG. 12).

Figure 3:
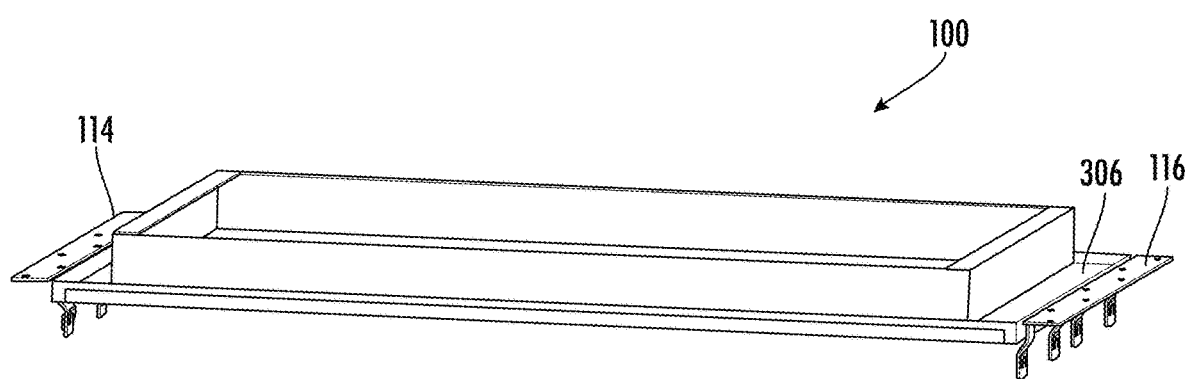
FIG. 3 is a partial assembly view of the filtered vent system of FIG. 1 showing brackets of a frame of the filtered vent system surrounding the preexisting frame.

The filtered vent system 100 includes a pair of brackets 114, 116 that are fastened, for example, via screws to the ceiling (not illustrated). FIG. 3 illustrates a partial view of the frame 110, namely the brackets 114, 116 that mount to the ceiling on opposite sides of the preexisting vent frame 306. Thus, it should be readily appreciated that the filtered vent system 100 is easy to install because the preexisting vent frame 306 does not have to be removed. The preexisting vent frame 306 remains fixed in place while only its louvered vent plate 308 (FIG. 12) and air filter 302 (FIG. 12) are removed in order to install the filtered vent system 100. While a pair of brackets 114, 116 is illustrated, a single bracket, or more than two brackets, could be used to mount the frame 110 of the filtered vent system 100 to the ceiling. Typically, the brackets 114, 116 are of metal.

Figure 4:
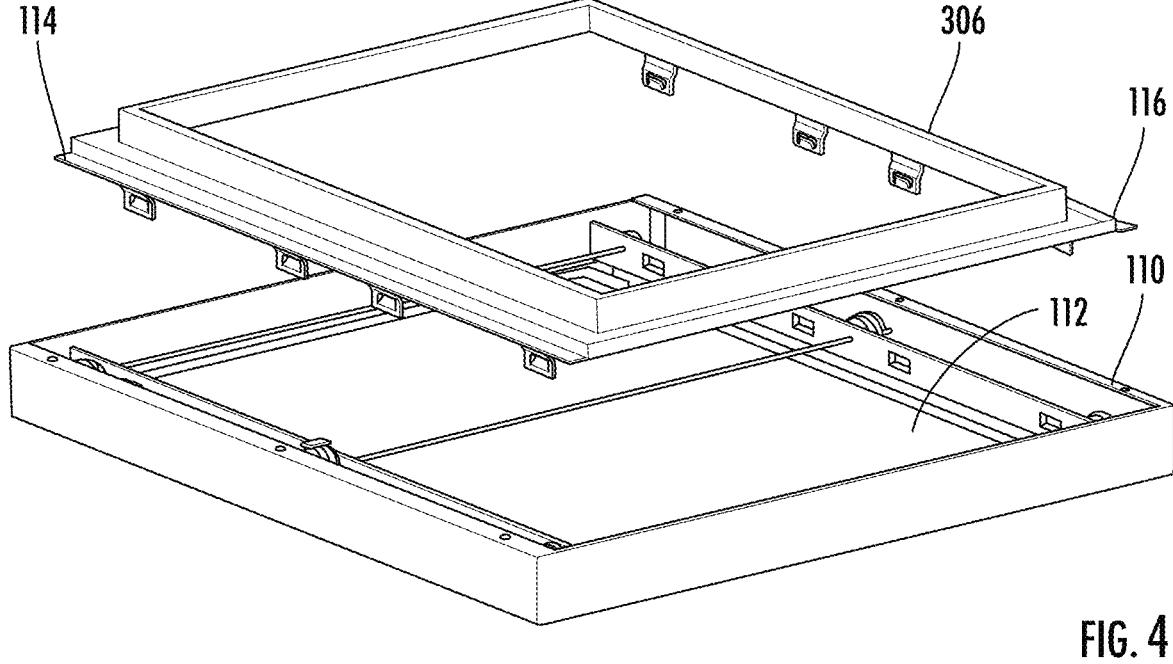
FIG. 4 is another partial assembly view of the filtered vent system of FIG. 1 with the frame in position to mount to the brackets of the frame.

FIG. 4 is a partial assembly view illustrating the brackets 114, 116 as if mounted to the ceiling (not illustrated) on opposed sides of the preexisting frame 306 with the frame 110 positioned below the preexisting frame 306 with the vent plate 106 (FIG. 2) carrying the air filter 112 inside the frame 110 in position to be mounted to the brackets 114, 116. Once the frame 110 is mounted to the brackets 114, 116, the frame 110 is fixed in place. The vent plate 106 (FIG. 2) carrying the air filter 112 is not part of the frame 110. The vent plate 106 (FIG. 2) carrying the air filter 112 is moveable between the first state, that is the closed state, where the vent plate 106 (FIG. 2) is in contact with the frame 110 to a second state, that is an open state (See FIG. 7), wherein in the vent plate 106 (FIG. 2) carrying the air filter 112 is outside the frame 110. The frame 110 and the vent plate 106 are typically made of metal.

Figure 5:
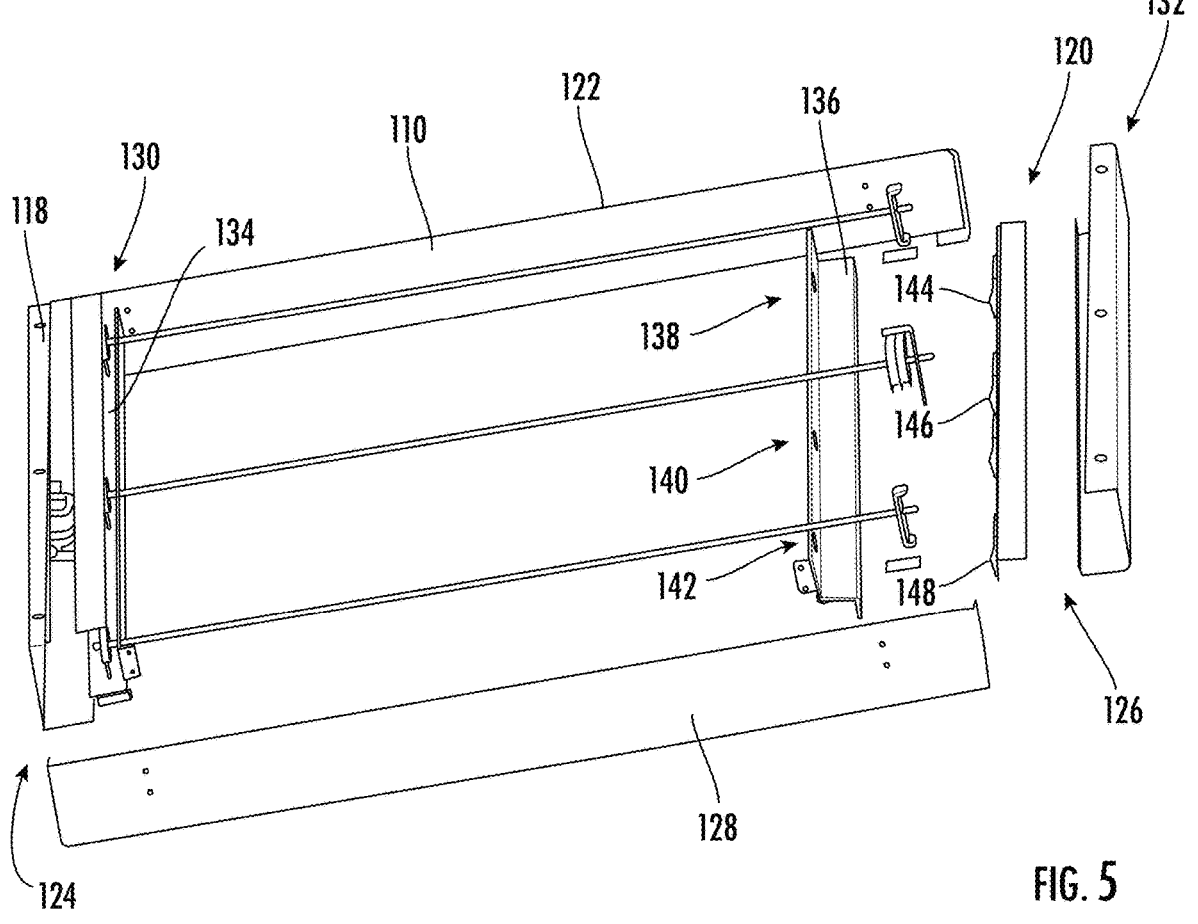
FIG. 5 is partial assembly view of the frame of the filtered vent system of FIG. 1.

FIG. 5 illustrates a partial assembly view of the frame 110. Frame 110 includes a main frame member 118 spaced apart from another main frame member 120 which is shown in assembly view. An endcap 122 connects the main frame member 118 and main frame member 120 at first ends 124, 126, and another endcap 128 connects the main frame member 118 and main frame member 120 at second ends 130, 132. The main frame members 118, 120 may be connected by any known fastener means, for example, screws. The main frame members 118, 120 and the end caps 122, 126 may be considered the four walls of the frame 110 that are in contact with the vent plate 106 in the closed state and which are not in contact with the vent plate 106 when the filtered vent system 100 is in the open state.

Main frame member 118 includes a through hole 133 (FIG. 2) which is an opening for receiving an actuator 136 (FIG. 7) therethrough. Main frame member 118 include an inner flange 134. Main frame member 120 includes an inner flange 136. Each inner flange 134, 136 is structured the same, and therefore only inner flange 136 is discussed with the understanding that the same structures and relationship therebetween is present on flange 134.

The inner flange 136 includes a plurality of through holes 138 that are apertures that mount via reception therein by a plurality of detents 144 located on the brackets 116. Bracket 116 is structured the same as bracket 114, and therefore only bracket 116 is discussed.

Figure 6:
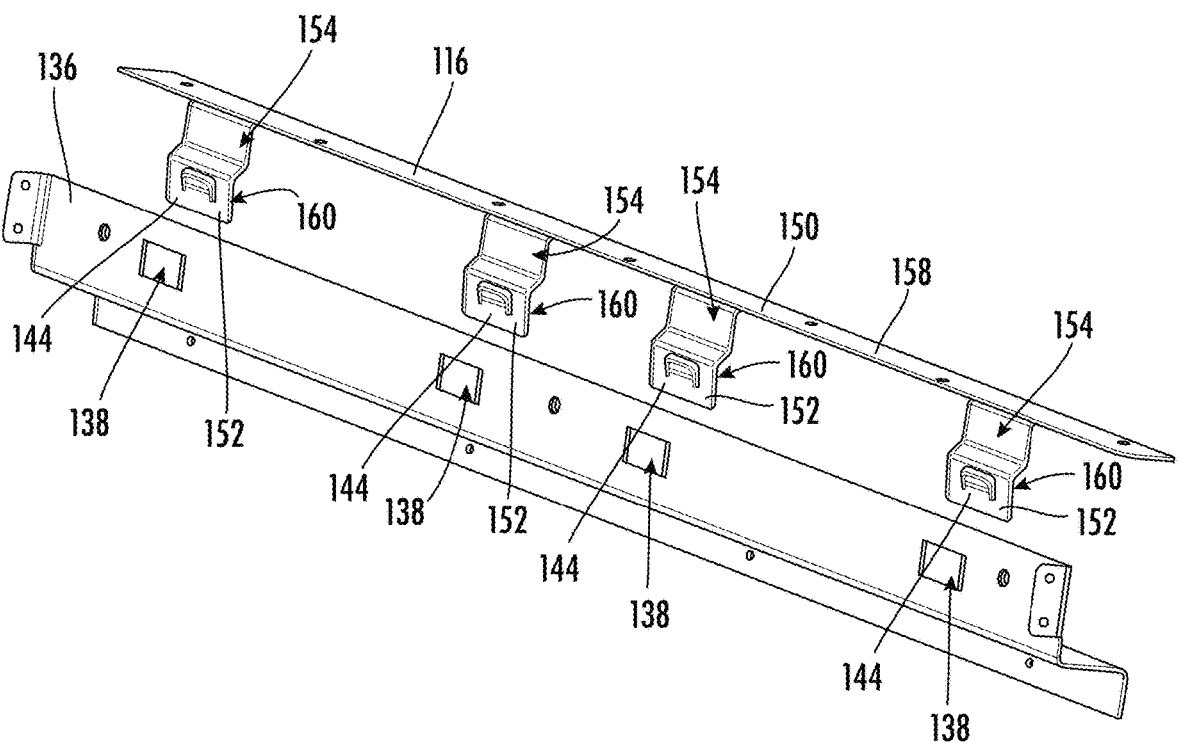
FIG. 6 is a partial assembly view of the bracket of the frame and an inner flange of the frame of the filtered vent system of FIG. 1.

FIG. 6 better illustrates the plurality of detents 144 of the bracket 116 and the plurality of through holes 138, 140, 142 of the inner flange 136. Bracket 116 includes a bracket body 150 and a plurality of arm members 152 extending away from the bracket body 150 in a direction generally perpendicular to a planar surface 158 of the bracket body 150. In other words, when bracket 116 is mounted to the ceiling the arm members 152 extend in a direction away from the ceiling. By generally, it is meant within plus or minus five degrees. The plurality of arm members 152 are spaced apart from one another in parallel relation. Each one of the plurality of arm members 152 has a first portion 154 in contact with the bracket body 150 and a mounting portion 160 free from contact with the bracket body 150.

Each mounting portion 160 includes one of the plurality of detents 144. Each one of the detents 144 is received into one of the through holes 138 of the inner flange 136 of the frame 110 (FIG. 5) so as to mount the frame 110 (FIG. 5) to the bracket 116.

Figure 7:
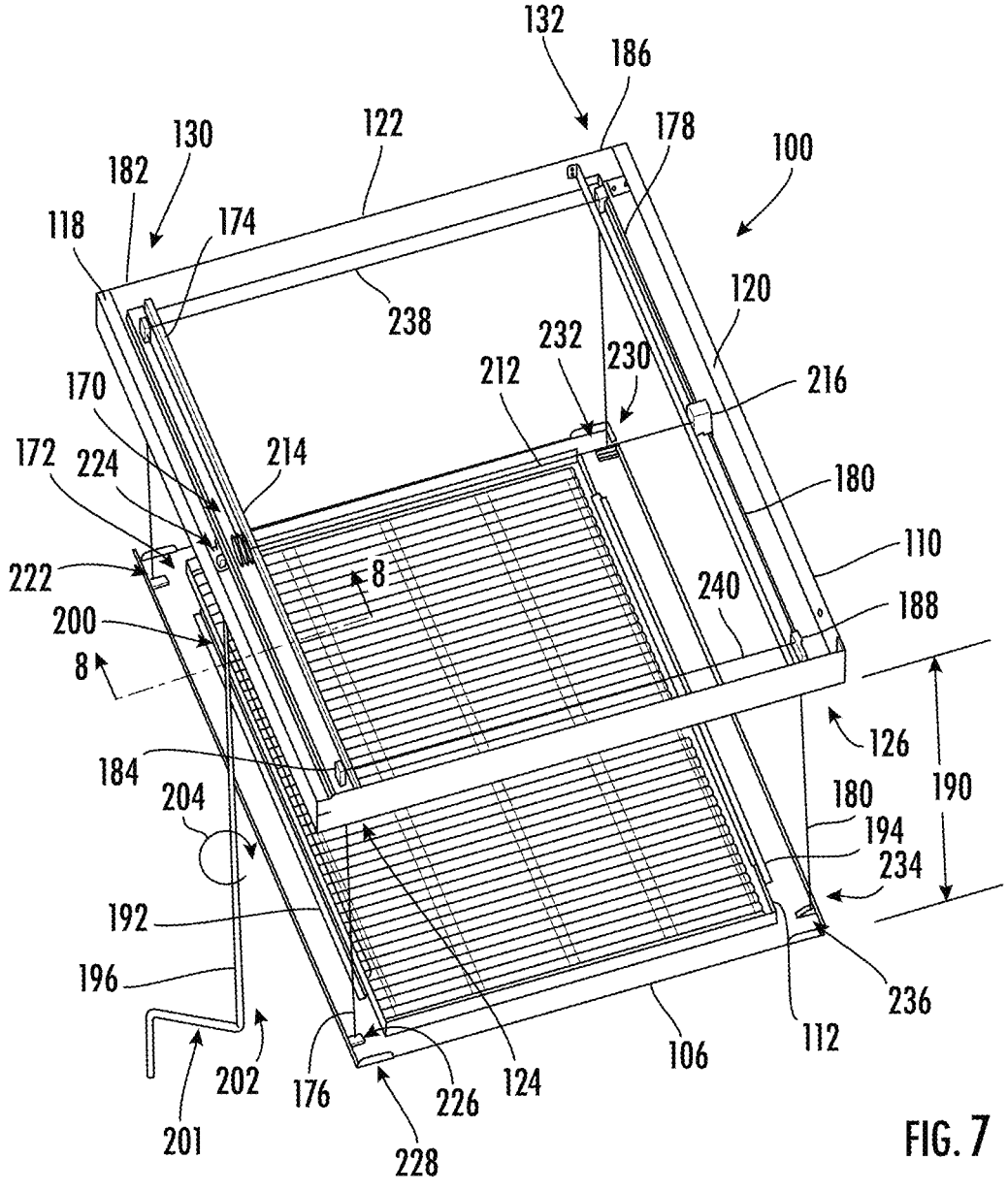
FIG. 7 illustrates a second state, that is an open state, of the filtered vent system of FIG. 1 with the brackets of the frame removed for purposes of illustration.

FIG. 7 illustrates a second state of the filtered vent system 100 with the brackets 114, 116 (FIG. 1) removed for the purposes of illustration. The second state is an open state wherein the vent plate 106 carrying the air filter 112 has been lowered out of the frame 110 via a hoist arrangement 170 that includes a gear assembly 172 (FIG. 8), ropes 174, 176, 178, 180 and pulleys 182, 184, 186, 188. In the open state, the vent plate 106 carrying the air filter 112 has been lowered a distance 190 sufficient to permit a user to view the air filter 112 for cleanliness and to remove the air filter 112 for either further inspection or to change it out with a new air filter 112. By "sufficient distance" 190, it is meant a distance between the frame 110 and the vent plate 106 carrying the air filter 112 that allows for a user to easily remove the air filter 112 from the vent plate 106. The distance will typically allow a user standing on the floor to easily remove the air filter 112 from the vent plate 106.

The air filter 112 is held in place by a pair of retaining members 144, 146 located on opposite sides of the air filter 112 and permitting the air filter 112 to be slid into and out of the retaining members 144, 146. While a pair of retaining members 192, 194 are shown, any number of known retaining devices can be used, for example, only one of the retaining members 192, 194, or a latch or plurality of latches that can be rotated to cover a portion of the air filter 112 or rotated to uncover the portion of the air filter 112 so as to permit removal of the air filter from the vent plate 106.

Figure 8:
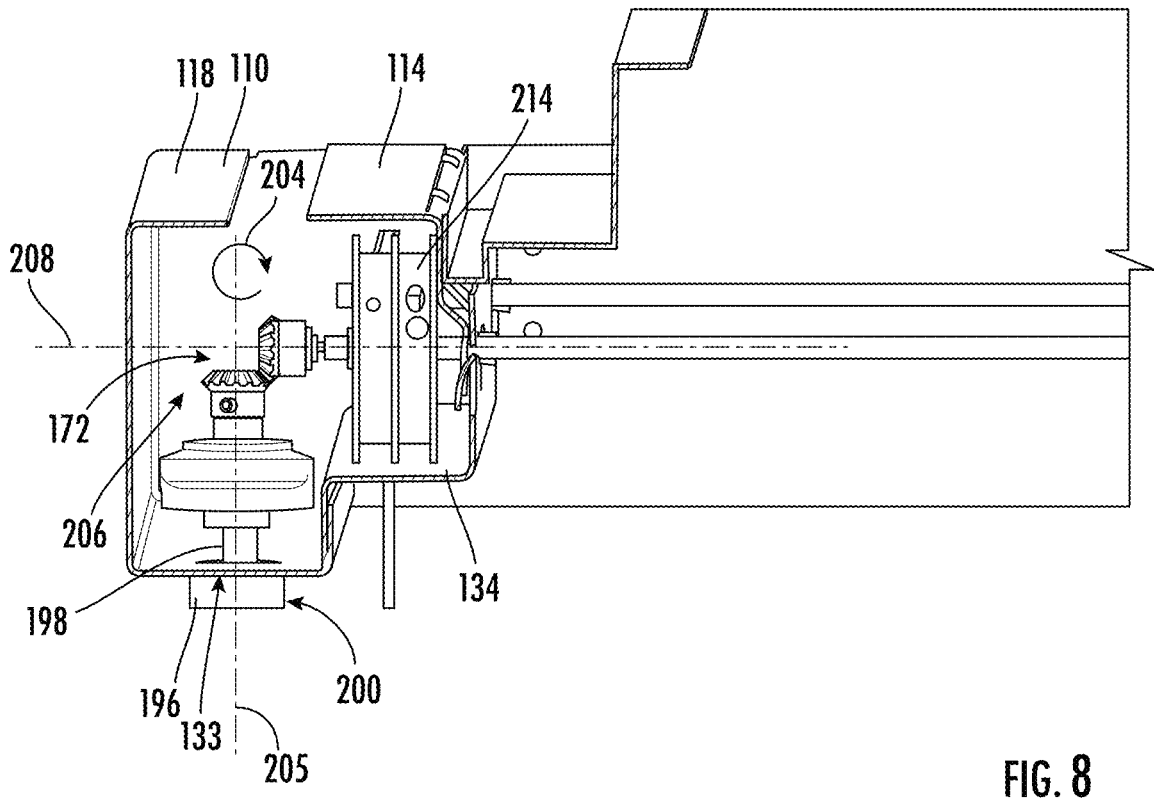
FIG. 8 illustrates a vertical cross section through a frame member of FIG. 7 at line 8-8.

In order to move the vent plate 106 from the closed position (FIG. 1) to the open position a user holds a crank pole 196 having an actuator 198 (FIG. 8) attached at an engagement end 200 of the crank pole 196 and a handle portion 201 at the opposite end 202 of the crank pole 196. The actuator 198 (FIG. 8) is inserted through the hole 133 (FIG. 8) in the main frame member 118. However, the other frame member 120 or end caps 122, 124 could provide the opening 133 (FIG. 8). A user turns the handle portion 201 to turn the actuator 198 so as to impart a rotational force 204 that may be clockwise in a first direction and counterclockwise in a second direction opposite the first direction as desired to actuate the hoist arrangement 170.

The actuator 198 is inserted into a frame opening 202 to actuate a gear assembly 204 of the hoist arrangement 170 (FIG. 8). FIG. 8 is a vertical cross taken through the main frame member 118, inner flange 134 and including bracket 114 (not present in FIG. 7) at line 8-8 of FIG. 7. A stepped channel 206 is defined by the main frame member 118 and the inner flange 134. The gear assembly 172 is mounted inside the stepped channel 206 of the frame 110. The gear assembly 172 converts the rotational force 204 of the actuator 198 from rotation about a first axis 205 defined by the longitudinal axis of the actuator 198 to a second axis 208 defined by a longitudinal axis of an axle 212 connecting a first central pulley 214 to another central pulley 216 (FIG. 7) located on frame member 120 (FIG. 7). The gear assembly 172 comprises a first beveled gear 218 driven by the actuator 198 that turns a second beveled gear 220 which turns the first central pulley 214 and axle 212 and the second central pulley 216. Other gear assemblies 172 are possible, for example, the gear assembly 172 may be a worm gear 250 (FIG. 11) driven by the actuator 198 that turns gear 252 (FIG. 11) which turns the first central pulley and axle 212 and the second central pulley 216.

Figure 9:
FIG. 9 illustrates a central pulley of the filtered vent system of FIG. 1.

The first central pulley 214 and second central pulley 216 are each dual spool (FIG. 9) and can spool two of the ropes 174, 176, 178, 180 simultaneously based on their wound direction. Thus, the first central pulley 214 includes rope 174 and rope 176 spooled thereon. (FIG. 9) Rope 174 extends over pulley 182 mounted at the second end 130 of the main frame member 118. An end 222 of the rope 174 connects to vent plate 106 at a first corner 224. Rope 176 extend over pulley 184 at the first end 124 of the main frame member 118. An end 226 of the rope 176 connects to the vent plate 106 at a second corner 228.

The second central pulley 216 mounted on main frame member 120 has ropes 178 and 180 spooled thereon. Rope 178 extends over pulley 186 mounted on the second end 132 of main frame member 120. An end 230 of the rope 178 connects to the vent plate 106 at a third corner 232 of the vent plate 106. Similarly, rope 180 extends over pulley 188 mounted on the first end 126 of the main frame member 120. An end 234 of the rope 180 connects at a fourth corner 236 of the vent plate 106. Axle 238 connects pulleys 182 and 184, while axle 240 connects pulleys 186, 188.

It can now be readily appreciated that the actuator 198 actuates the hoist arrangement 170 to either lower or raise the vent plate 106 as desired. The hoist arrangement 170 is not biased to either keep the vent plate 106 in the closed position (FIG. 1) or the open position (FIG. 7). Sufficient length of the ropes 174, 176, 178, 180, 182 is provided to permit a user standing on the floor to lower the vent plate 106 to a height above the floor and at a sufficient distance 190 from the frame 110 to permit the user to easily reach the air filter 112 carried by the vent plate 106 without having to use a ladder or reach overhead. The pulleys 174, 176, 180, 182 and ropes 174, 176, 178, 180 and axles 212 238, 240 together make up pulley system 242 of the hoist arrangement 170.

Figure 10:
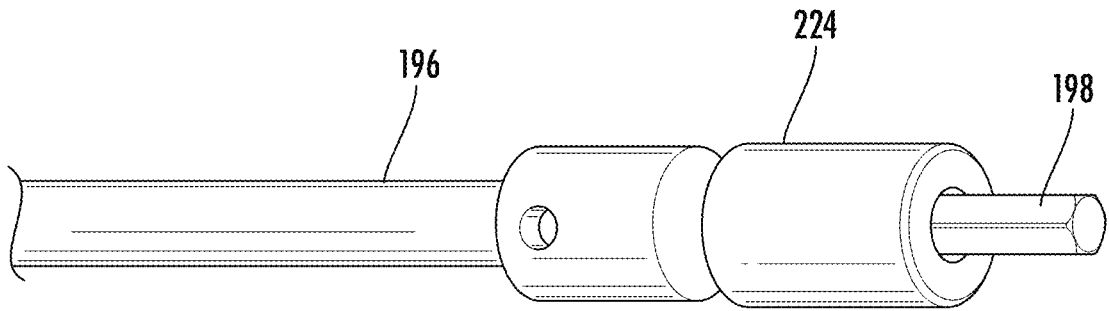
FIG. 10 illustrates a torque limiter of an actuator on a crank pole for actuation the filtered vent system of FIG. 1.

FIG. 10 illustrates the actuator 198 mounted on crank pole 196. Actuator 198 may include a torque limiter 244 to prevent over torque of the gear assembly 172 (FIG. 8). However, as can be readily appreciated, the crank pole 196 may be of many different designs provided that it can be easily extended or contracted by the user to read the gear assembly 172 (FIG. 8) and while a torque limiter 244 may provide known advantages, it does not have to be present on the actuator 198 as the user can use their experience to prevent over-torque of the gear assembly 172 (FIG. 8).

Returning to FIG. 7 and FIG. 8, crank pole 196 has a changeable longitudinal length. By way of non-limiting examples, the crank pole 196 may be collapsible and expandable or a telescoping pole which permits the user to extend the crank pole 196 to reach the frame 110 while the user stands on the floor. It can be readily appreciated at this point in the disclosure that a user can rotate the crank pole 196 in a first rotational direction to rotate the actuator 198 to turn the gear assembly 172 which turns the pulleys 174, 176, 180, 182 to unspool and extend the ropes 174, 176, 178, 180 to lower the vent plate 106 carrying the air filter 112. Rotating the crank pole 196 in a second rotational direction opposite the first rotational direction spools and thereby retract the ropes 174, 176, 178, 180 to raise the vent plate 106 carrying the air filter to the closed state. (FIG. 1). The ropes in the pulley system 242 are in an unbiased state. When the gear assembly 172 stops its rotation, the distance 190 remains fixed until rotation begins again.

At this point in the disclosure, it can be readily appreciated that a user having a home or building with a preexisting vent frame 306 (FIG. 12) in an intake of existing return air duct 304 no longer has to endure the inconvenience of using a ladder to reach overhead to remove the louvered vent plate 308 or try to balance the vent plate 308 as they try to swing it open or lower it in some fashion. Instead, the user can install the filtered vent system 100 by removing the existing louvered vent plate 308 while the preexisting frame 306 remains fixed to the ceiling.

The user then merely has to fasten, with screws in most instances, the pair of brackets 114, 116 (FIG. 3) on a portion of the ceiling 310 (FIG. 12) surrounding the preexisting vent frame 306. Once the brackets 114, 116 (FIG. 3) are installed, the user mounts the new frame 110 (FIG. 1) carrying a new vent plate 106 (FIG. 2) with a new air filter 112 (FIG. 1) to the brackets 114, 116 (FIG. 1) and over the preexisting vent frame 306 (FIG. 1).

The user may thereafter use a crank pole 196 (FIG. 7) that has an actuator 198 (FIG. 8) on its end. The actuator 198 (FIG. 8) is placed to extend through the opening 133 (FIG. 8) in the main frame member 118 (FIG. 8) of the new frame 110 (FIG. 8) to actuate the hoist arrangement 170 (FIG. 8) to lower the vent plate 106 (FIG. 7) carrying the air filter 112 (FIG. 7) from the frame 110 (FIG. 7) to the desired height above the floor. Once at the desired height, the user can easily remove the air filter 112 (FIG. 7) from the vent plate 106 (FIG. 7) for inspection or replacement. Once inspected or replaced, the user uses the crank pole 196 (FIG. 7) to actuate the actuator 198 (FIG. 8) to raise the vent plate 106 (FIG. 7) carrying the air filter 112 (FIG. 7) to its closed position (FIG. 1) wherein the vent plate 106 (FIG. 2) is again in contact with the frame 110 (FIG. 2).

The vent plate 106 (FIG. 7) is adjustable between a plurality of positions between the closed state (FIG. 1) and the open state (FIG. 7) as determined by the length of the ropes 174, 176, 178, 180 and the distance between the teeth of the gears of the gear assembly 172 (FIG. 8) while such adjustability therefore is not infinite, it may be said to be continuous between the open and closed positions. (FIG. 1 and FIG. 7). Actuation of the hoist arrangement 170 turns all the pulleys 174, 176, 178, 180, and thus spools or unspools all the ropes 174, 176, 178, 180 simultaneously depending on the actuation direction.

Figure 11:
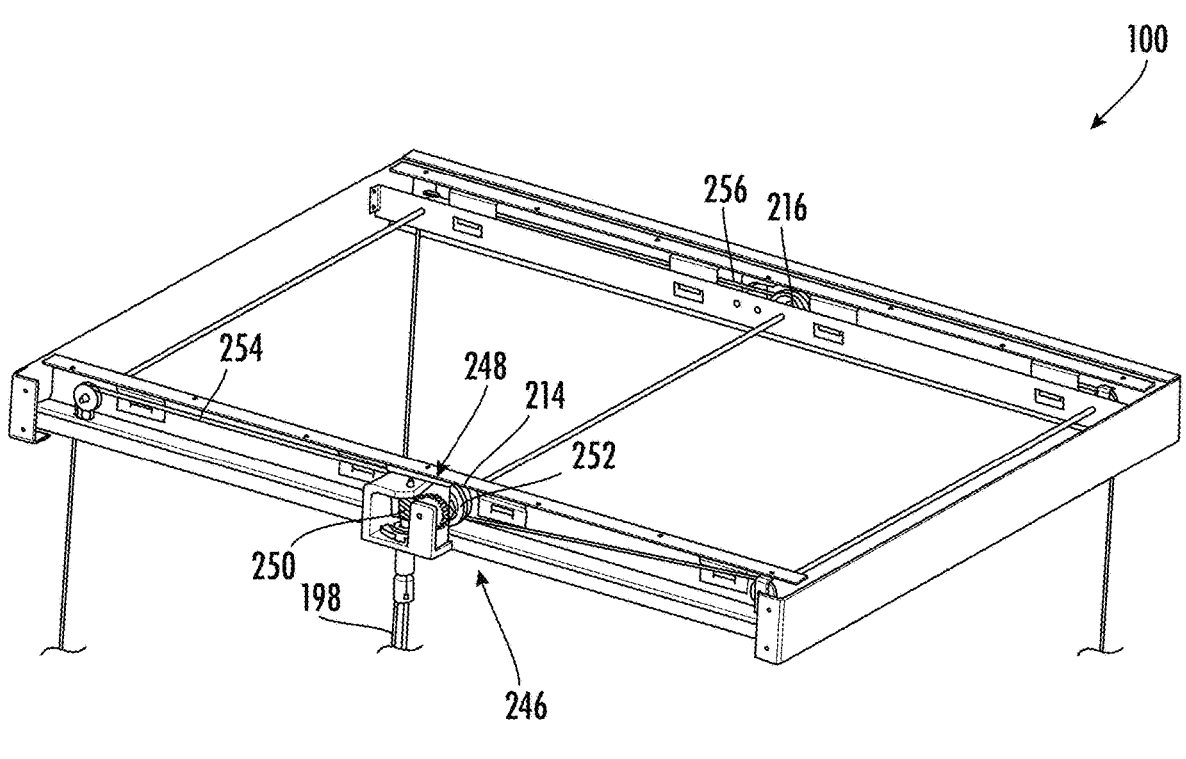
FIG. 11 illustrates the filtered vent system of FIG. 1 with a second embodiment of a hoist arrangement.

FIG. 11 shows filtered vent system 100 with main frame member 118 (FIG. 7) removed to illustrate another hoist arrangement 246 that may be used instead of hoist arrangement 170 (FIG. 7). Hoist arrangement 246 is the same as hoist arrangement 170 (FIG. 7) except for the differences described here. Actuator 198 actuates gear assembly 248 which is made up a worm gear 250 which transfers the rotational force of the actuator 198 to gear 252. Rotation of gear 252 in a first rotational direction unspools rope 254 from the first central pully 214. Rotation of gear 252 in a second rotational direction spools rope 254 on the first central pulley 214. Thus, unlike hoist arrangement 170 (FIG. 7) only one rope 254 instead of two ropes 174, 176 (FIG. 7) is spooled to the first central pulley 214. Likewise, only one rope 256 is spool on the second central pulley 216 instead of two ropes 178, 180 (FIG. 7).

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

10

What is claimed is:

1. A filtered vent system for a return air duct in a ceiling, the vent system comprising:
   a bracket configured to mount to the ceiling;
   a vent frame configured to be mounted to the bracket to fix the vent frame to the ceiling;
   a vent plate carrying an air filter;
   a hoist arrangement mounted to the vent frame and connected to the vent plate;
   wherein the vent frame defines an aperture configured to receive an actuator therethrough to actuate the hoist arrangement to move the vent plate from a first state in contact with the vent frame to a second state free from contact with the vent frame and spaced apart from the vent frame a distance permitting removal of the air filter.

2. The filtered vent system of claim 1, where the bracket is a pair of brackets configured to mount on opposite sides of the air duct.

3. The filtered vent system of claim 1, wherein each one of the pair of brackets comprises:
   a bracket body;
   a plurality of arm members extending away from the bracket body in a direction generally perpendicular to the bracket body and the ceiling to which the bracket body is configured to mount;
   wherein the plurality of arm members are spaced apart from one another in parallel relation, each one of the plurality of arm members comprising a first portion in contact with the bracket body and a mounting portion free from contact with the mounting portion.

4. The filtered vent system of claim 3, wherein the mounting portion includes a plurality of detent members and the frame includes a plurality of apertures, wherein each one of the detent members is received into a respective one of the plurality of apertures of the frame so as to mount the frame to the bracket.

5. The filtered vent system of claim 1, wherein the frame is configured to surround the air duct without any portion thereof extending into the air duct.

6. The filtered vent system of claim 1, wherein the vent plate has a vent body having four side walls surrounding a slotted face of the vent body, wherein the side walls are in contact with the frame in the first state.

7. The filtered vent system of claim 1, wherein the frame does not move as the vent plate moves from the first state to the second state and from the second state to the first state.

8. A filtered vent system for a return air duct in a ceiling, the vent system comprising:
   a bracket configured to mount to the ceiling;
   a vent frame configured to be mounted the bracket to fix the vent frame to the ceiling;
   a vent plate carrying an air filter;
   a hoist arrangement mounted to the vent frame and connected to the vent plate;
   wherein the hoist arrangement is actuable through an aperture in the vent frame to move the vent plate from a first state in contact with the vent frame to a second state free from contact with the vent frame and spaced apart from the vent frame a distance permitting removal of the air filter;
   wherein an actuator extends through the aperture to actuate a gear assembly of the hoist arrangement mounted to the vent frame to move the vent plate.

9. The filtered vent system of claim 8, wherein the actuator rotates in a first actuation direction to actuate the gear assembly to turn in a first direction to rotate a plurality of pulleys in a pulley system of the hoist arrangement to move the vent plate from the first state to the second state.

10. The filtered vent system of claim 9, wherein the actuator moves in a second actuation direction, opposite the first actuation direction to actuate the gear assembly to turn in a second direction opposite the first direction to rotate the plurality of pulleys in the pulley system to move the vent plate from the second state to the first state, and wherein in the first state the vent plate is in contact with the vent frame.

11. The filtered vent system of claim 10, wherein the pulley system includes ropes connected to the vent plate in an unbiased state.

12. The filtered vent system of claim 11, wherein simultaneously the ropes are unwound or wound about the plurality of pulleys so as to lower or raise, by rotation of the plurality of pulleys, the vent plate from the first position to the second position and from the second position to the first position.

13. The filtered vent system of claim 9, wherein the actuator is located on the end of a crank pole.

14. The filtered vent system of claim 13, wherein the actuator includes a torque limiter.

15. The filtered vent system of claim 13, wherein the crank pole is moveable between a first longitudinal length and a second longitudinal length.

16. The filtered vent system of claim 8, wherein the actuator is mounted to a crank pole, the crank pole with the actuator defining a first length, wherein rotation of the crank pole in a first rotational direction to actuate the actuator does not change the first length as the vent plate moves from the first position to the second position.

17. The filtered vent system of claim 16, wherein the first length does not change with rotation of the crank pole in a second rotational direction, opposite the first rotational direction, to move the vent plate from the second position to the first position.

* * * * *